April 23, 1940.　　　　E. G. NYBERG　　　　2,198,315
ENAMEL LINED BEER BARREL
Filed May 17, 1937　　　3 Sheets-Sheet 2

Erik G. Nyberg
INVENTOR.

BY

ATTORNEY.

April 23, 1940.   E. G. NYBERG   2,198,315
ENAMEL LINED BEER BARREL
Filed May 17, 1937   3 Sheets-Sheet 3

Erik G. Nyberg
INVENTOR.

BY
ATTORNEY.

Patented Apr. 23, 1940

2,198,315

UNITED STATES PATENT OFFICE 2,198,315

ENAMEL LINED BEER BARREL

Erik G. Nyberg, Milwaukee, Wis., assignor to A. O. Smith Corporation, Milwaukee, Wis., a corporation of New York Application May 17, 1937, Serial No. 143,021

3 Claims. (Cl. 220—15)

This invention relates in general to a double walled metal barrel comprising an outer protective will and an inner container spaced therefrom and lined with vitreous enamel or similar material.

The principal object of the invention is to provide suitable means for supporting the inner container in spaced relation to the outer wall so as to protect the container from shocks and deformations which might crack, chip or otherwise injure the vitreous enamel lining of the container.

Another object is to provide a light-weight, heat-insulated and acid-resistant container suitable for the transporting and storing of beer and the like.

In the accompanying drawings which illustrate a preferred embodiment of the invention, Figure 1 is a longitudinal central section of the barrel on a plane through the bung and tap openings;

Figure 1:
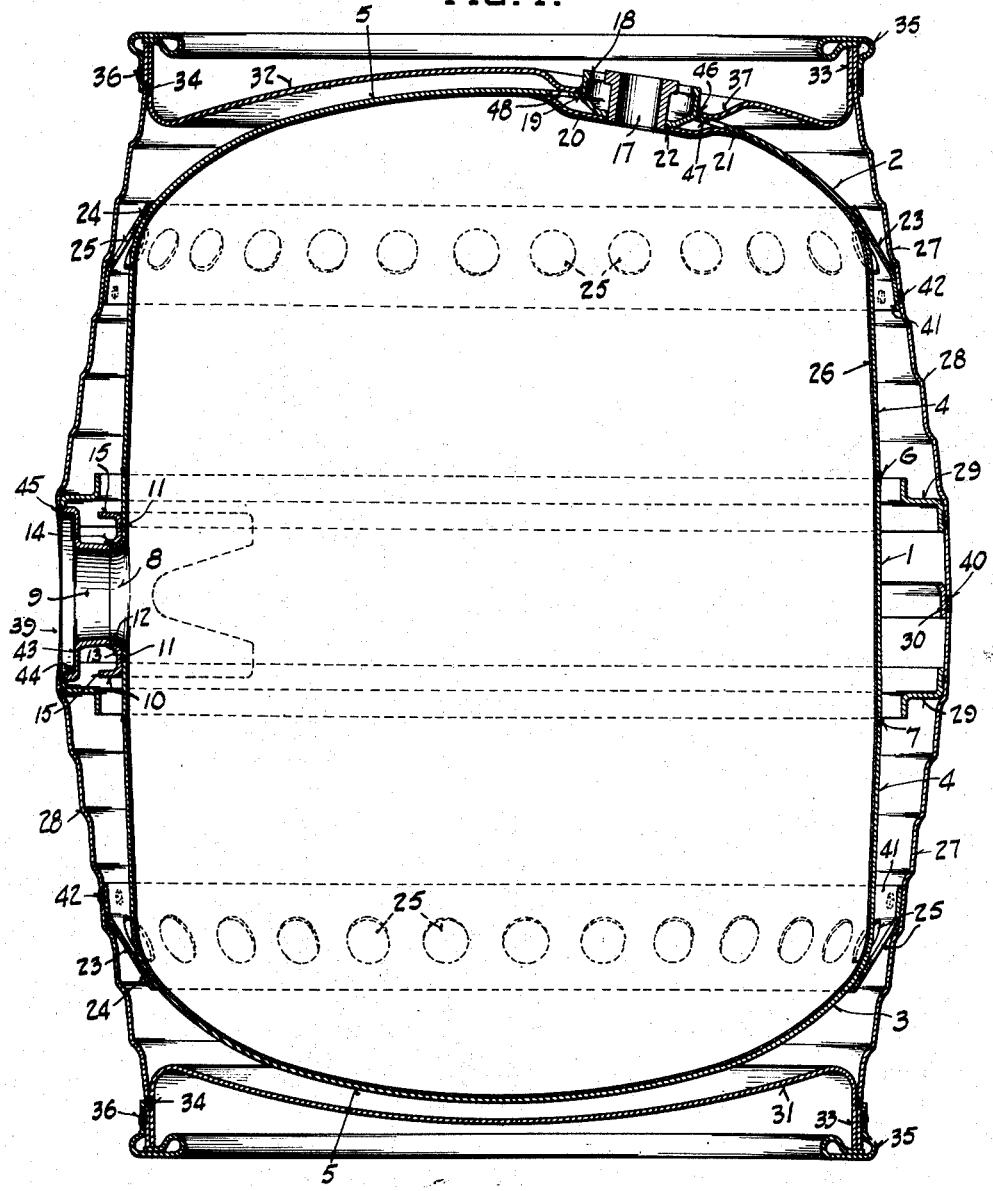
Figure 2:
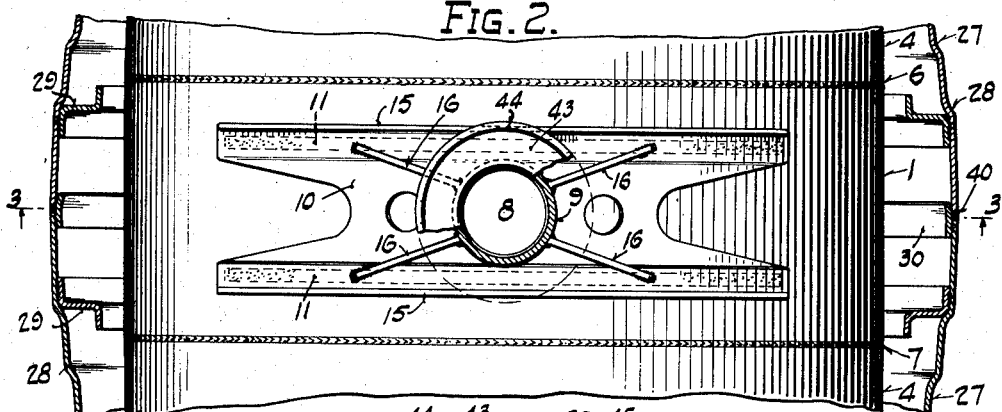
Fig. 2 is a view of the mid-portion of the barrel, the outer wall being shown in section and the inner container being shown in elevation and presenting the bung opening.
Figure 3:
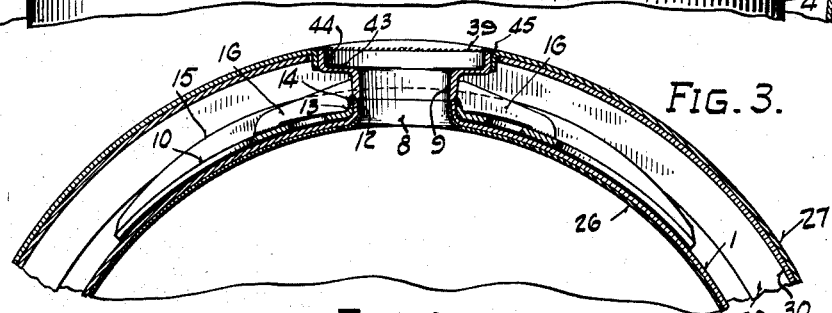
Fig. 3 is a section taken on the line 3—3 of Fig. 2.
Figure 4:
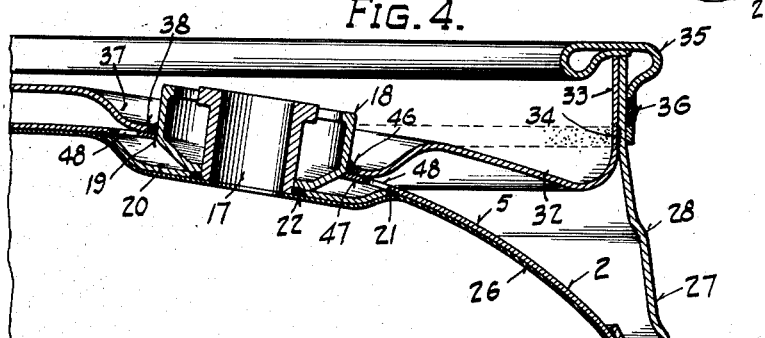
Fig. 4 is an enlarged section view of the upper, right hand portion of the barrel as viewed in Fig. 1.

The barrel comprises, in general, an inner vitreous enamel lined container, an outer protective shell or casing, spaced therefrom, suitable means for resiliently supporting the container from the shell for limited relative movement, and suitable fittings. After complete fabrication of the barrel the protective casing is preferably galvanized to prevent corrosion and the barrel as constructed readily adapts itself to this treatment.

The inner container which is slightly bilged is fabricated from sheet metal and comprises a cylindrical portion 1 at the bilge and two deeply dished end sections 2 and 3 each having a substantially cylindrical side wall 4 and cured head 5. The rim of the head 5 is curved on a smaller radius where it merges with the wall 4 to add stiffness to the rim.

The end sections 2 and 3 are preferably joined to the portion 1 by arc welds 6 and 7 respectively.

The portion 1 has a bung opening 8 provided with a tubular bung fitting 9 and, to prevent any localized stresses to the inner container from shocks to the bung fitting, such as driving of a bung, the portion 1 adjacent to the bung opening is reenforced by a saddle 10 which straddles the opening and extends circumferentially a short distance each side thereof and is preferably stitch welded to the container along the marginal portions of the saddle as at 11. As shown in the drawings the container and the saddle, at the opening 8, are flared outwardly to form lips 12 and 13 respectively to which the bung fitting 9 is attached by the arc weld 14. The rounding flare of lip 12 permits it to be efficiently enameled. The inner diameter of the enameled lip is made slightly greater than that of the opening in bung fitting 9 so that as the bung is driven into place it moves over the enamel without injuring it but after the bung becomes wet from the liquid contents of the barrel the bung swells and tightly engages the enameled lip and thus prevents the liquid from contacting any metal part of the bung fitting. See Fig. 6.

Figure 6:
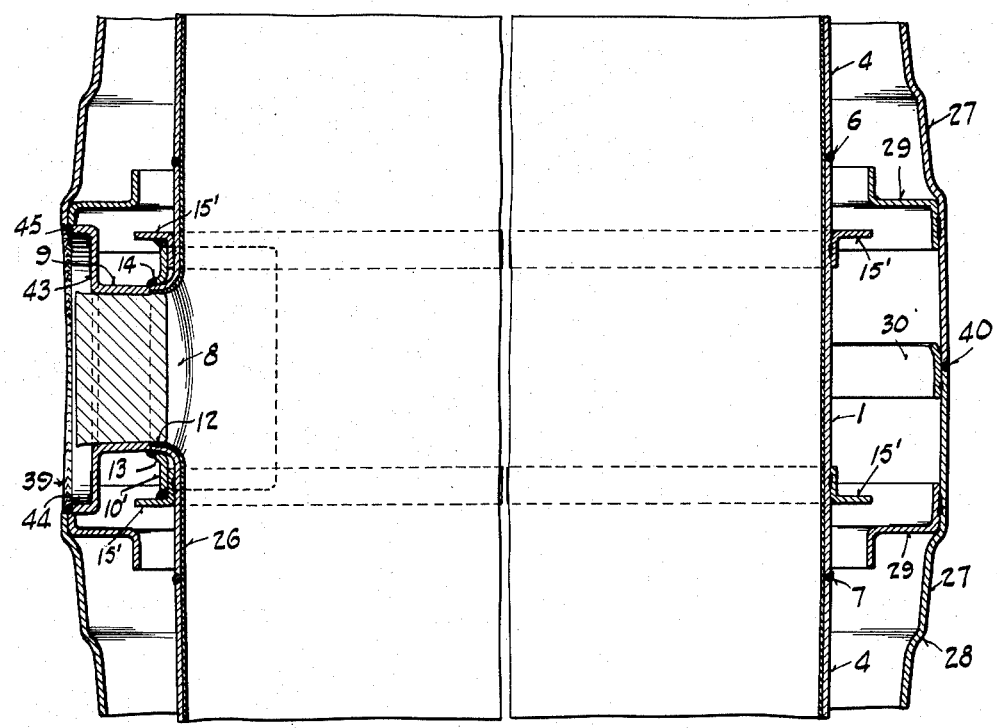
Fig. 6 is a view of the mid-portion of the barrel showing a modified method of reenforcing the inner container.

Marginal flanges 15 formed on the saddle and radiating fins 16, welded to the bung fitting and at their outer ends bearing on and welded to the saddle, stiffen the saddle and tend to distribute any shocks to the bung fitting over a large area of the container thus minimizing any chance of injury to its lining. To more widely distribute any shocks to the bung fittings and to reenforce the mid-portion of the container, especially in large barrels, angle-iron rings 15', positioned at the marginal flanges of the saddle 10', are welded to the container, as shown in Fig. 6.

As is customary in beer barrels the top head 5 has a tap fitting 17 surrounded by a tap cup 18. The head has an opening 19 for receiving said cup and is provided on its inner side with a dished circular metallic sheet 20 secured at its perifery to the head by the weld 21 which surrounds the opening 19 and is spaced therefrom. The dished member 20 has an opening, concentric with opening 19, for receiving the end of tap fitting 17 which with the cup 18 is welded to said dished member by weld 22.

For resiliently supporting the container within the outer shell a sheet metal band 23 having the shape of a conical frustum is stitch welded along its small end to the rim of each head as at 24.

Figure 5:
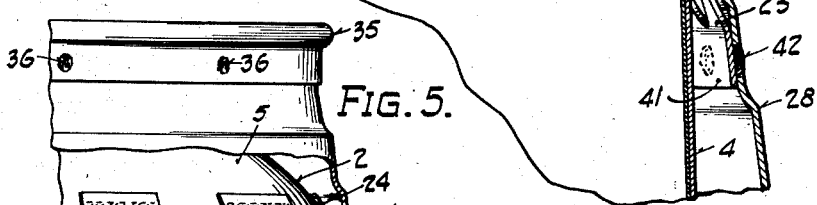
Fig. 5 is fragmentary view of the barrel showing a modified form of container support.

The bands flare outwardly and toward each other to engage the outer shell and have perforations 25 for providing more resiliency to the band and also for reducing heat conduction from the shell to the container. It is preferred to employ a continuous band although a number of short spaced sections 23' extending circumferentially may be used as shown in Fig. 5.

All of the above named fittings are preferably welded to their respective section of the container before said sections are assembled and joined by arc welds 6 and 7.

After the inner container has been completely welded it is coated on the inside with vitreous enameling material and the coating dried. The container is then heated in a furnace in any suitable manner to fuse the enamel and provide the glass lining 26 for the container.

In the manufacture of the barrel the enamel lined container with its fittings attached is completed as a unit and then mounted in the outer protective shell. For this purpose the outer shell is fabricated in halves each to be slipped over opposite ends of the container and joined at their circumferential meeting edges by welding.

The side wall 27 of each half is preferably formed from a flat sheet of fairly high carbon steel rolled into frustrum conical shape and having its longitudinal meeting edges electrically flash welded. The wall is then slightly bilged and provided with circumferential corrugations or steps 28 to strenghen it.

To further strengthen the wall a sheet metal Z bar ring 29 is stitch welded to the inner side of each half adjacent its larger end. The rings 29 are preferably heat treated to increase their elastic limit and therefore afford greater resistance to deformation of the wall.

To facilitate assembling of the halves the lower section has a stabbing ring 30 spotwelded to its upper edge. This ring also acts to stiffen the mid-portion of the outer shell and serves as the base of a welding groove when the halves are assembled for welding.

The lower and upper halves are provided with heads 31 and 32 respectively. Each head is dished outwardly to provide suitable space between it and its respective inner container head and has a marginal outwardly extending cylindrical flange 33 adapted to fit snugly in the small end portion of its respective side wall to which it is stitch welded as at 34.

After the heads 31 and 32 have been assembled, a chime 35 is slipped over the end of each section and secured thereto by key welds 36, about eight key welds for each chime being sufficient.

The upper head 32 is dished at 37 to engage the upper head 5 of the container when assembled. The dished portion 37 is provided with an opening 38 for receiving the tap cup 18 which extends into the dished portion. The exposed position of the cup is essential for the proper galvanizing of the cup.

A semicircular notch is provided in the wall at the open end of each half so that when the halves are assembled with the notches opposed a circular bung opening 39 is formed.

The units being thus fabricated are ready for assembly. The shell halves are slipped onto their respective ends of the container with the bung and tap openings registering with the bung and tap fittings of the container. The shell is arc welded along its circumferential seam 40. Each conical band 23 whose free edge 41 tapers to conform with the taper of the outer wall 27 nests into said wall and is key welded thereto as at 42, about eleven such welds to each band having been found sufficient for a fifteen and one half gallon barrel.

Mounting the container within the shell by these angularly disposed resilient supports permits limited lateral and transverse relative movement and thereby protects the container from any shock the shell may receive.

To permit this relative movement and to relieve the bung fitting 9 from undue strains it is provided with a flange 43 of reduced section to make it more flexible. The flange is provided with a circumferential lip 44 which engages the side of opening 39 in the shell and recessed portions of the adjacent flanges of rings 29. The casing, rings 29 and flange 44 of fitting 9 are joined by weld 45.

At the tap fitting the tap cup 18, head 2 at the opening 19, and head 32 at the opening 38 are all secured together by arc weld 46. The portion 47 of the top head 5 defined by the weld 21 and the cup 18 has a series of perforations 48 and cooperates with the dished portion 37 of head 32 to provide flexibility for relieving the tap fitting from any strains due to the relative movement of the container and shell.

Figure 7:
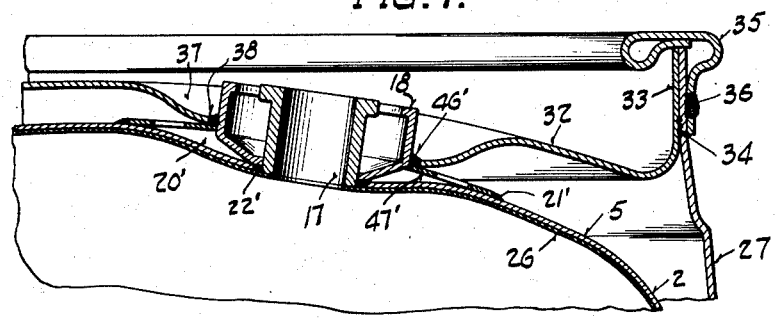
Fig. 7 is a view similar to Fig. 4 showing a modified form of head construction adjacent the tap fittings.

As shown in Fig. 7, instead of employing the dished member 20 at the tap opening, the upper head 5 of the ontainer may be dished as at 20' and reenforced over said dished portion by a plate 47' which surrounds the tap cup 18 and is secured to the head by the weld 21'. The tap fitting 17 and cup 18 are secured to head 5 by weld 22' which in this alternative construction is the only weld adjacent the tap opening which is exposed to the enamel lining. The cup 18, dished portion 37 of head 32 and plate 47' are secured together by weld 46'.

A barrel thus constructed provides a container having a vitreous enamel lining which is readily cleaned and sterilized. It protects the container from shock and deformation by resiliently mounting it in a protective shell. It provides heat insulation by providing an air space between the container and outer shell. This space may contain additional heat insulating material.

Various embodimets of the invention may be made without departing from the spirit and scope of the invention as defined in the accompanying claims. Certain features of the invention not claimed herein are covered in my copending application, Serial No. 322,868, filed on March 8, 1940.

I claim:

1. In combination in a double wall sheet metal barrel, an outer protective shell, an inner vitreous enamel lined container spaced from said shell and means supporting said container from said shell for limited relative movement comprising two circumferentially extending resilient bands each secured at one edge to the rim of its respective head of the container and angularly disposed toward the bilge of the shell and secured at its other edge to the shell wall.

2. In combination in a double wall sheet metal barrel having bung and tap fittings, an outer protective shell, an inner enamel lined container spaced from said shell, resilient supporting means for said container diagonally disposed between the container and the shell and attached to the container near the curved portion of the heads thereof and having their outer edges extending toward the center of the barrel and attached to the shell wall, and resilient means at the bung and tap fittings to permit limited relative movement of the container and the shell.

3. In combination in a double wall sheet metal barrel having bung and tap openings, an outer protective shell comprising deep cupped halves welded along their central seam, an inner enameled lined container spaced from said shell and having a reenforcing saddle at the bung opening and a reenforcing disk at the tap opening, resilient supporting means for said container diagonally disposed between the container and the shell and attached to the container near the curved portion of the heads thereof and having their outer edges extending toward the center of the barrel and attached to the shell wall, and resilient means at the bung and tap openings to permit limited relative movement of the container and the shell.

ERIK G. NYBERG.